United States Patent
Tseng

(10) Patent No.: US 8,449,124 B2
(45) Date of Patent: May 28, 2013

(54) LEVER ACTUATED LENS ADJUSTMENT MODULE

(75) Inventor: Yung-Chuan Tseng, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 395 days.

(21) Appl. No.: 12/834,445

(22) Filed: Jul. 12, 2010

(65) Prior Publication Data

US 2011/0051103 A1 Mar. 3, 2011

(30) Foreign Application Priority Data

Sep. 1, 2009 (CN) .......................... 2009 1 0170644

(51) Int. Cl.
*G03B 3/00* (2006.01)
*G03B 21/14* (2006.01)
*G02B 7/02* (2006.01)
*G02B 15/14* (2006.01)

(52) U.S. Cl.
USPC ............ 353/101; 353/100; 359/694; 359/822

(58) Field of Classification Search
USPC .................... 353/70, 100–101, 119; 359/642, 359/676, 694–695, 699–706, 811, 813, 819, 359/822–823, 825–826
See application file for complete search history.

(56) References Cited

U.S. PATENT DOCUMENTS

| | | | |
|---|---|---|---|
| 6,469,839 B2 * | 10/2002 | Agata ........................... | 359/694 |
| 6,547,402 B2 * | 4/2003 | Masuda ........................ | 353/101 |
| 6,909,560 B2 * | 6/2005 | Lin et al. ...................... | 359/813 |
| 6,966,657 B2 * | 11/2005 | Van De Velde et al. ...... | 353/101 |
| 7,055,971 B2 | 6/2006 | Gishi | |
| 7,090,360 B2 * | 8/2006 | Kuroda et al. ................ | 353/119 |
| 7,164,546 B2 * | 1/2007 | Miyashita et al. ............ | 359/813 |
| 7,165,848 B2 * | 1/2007 | Gishi ............................ | 353/88 |
| 7,354,161 B2 | 4/2008 | Kuroda | |
| 7,573,651 B2 * | 8/2009 | Wei et al. ..................... | 359/694 |
| 7,658,499 B2 * | 2/2010 | Meng et al. ................... | 353/101 |
| 7,950,810 B2 * | 5/2011 | Liao et al. .................... | 353/101 |
| 7,969,665 B2 * | 6/2011 | Tseng ........................... | 359/813 |
| 2003/0081185 A1 * | 5/2003 | Nakano et al. ................. | 353/97 |
| 2005/0030491 A1 * | 2/2005 | Gishi ............................ | 353/101 |
| 2005/0270502 A1 * | 12/2005 | Iinuma ......................... | 353/101 |
| 2007/0052935 A1 * | 3/2007 | Nakamura .................... | 353/101 |
| 2007/0058133 A1 | 3/2007 | Totani | |
| 2009/0002645 A1 * | 1/2009 | Lee et al. ...................... | 353/101 |
| 2009/0185145 A1 * | 7/2009 | Kitahara et al. .............. | 353/101 |

* cited by examiner

*Primary Examiner* — Tony Ko
*Assistant Examiner* — Jori S Reilly-Diakun
(74) *Attorney, Agent, or Firm* — WPAT, PC; Justin King

(57) ABSTRACT

A lens-adjusting module includes a base, a lens device, a second tray, and an adjusting device. The lens device includes a first tray and a lens being fixed to and contacting the first tray. The first and the second trays are movably disposed on and contact the base. The first tray is movably disposed on the second tray and located between the second tray and the base. The adjusting device includes a first lever and a second lever pivoted to the base. A part of the first lever and a part of the second lever are slidingly disposed on the first tray. The first lever rotates to drive the first and the second trays to move relatively to the base along a first axis. The second lever rotates to drive the first tray to move relatively to the second tray and the base along a second axis.

18 Claims, 20 Drawing Sheets

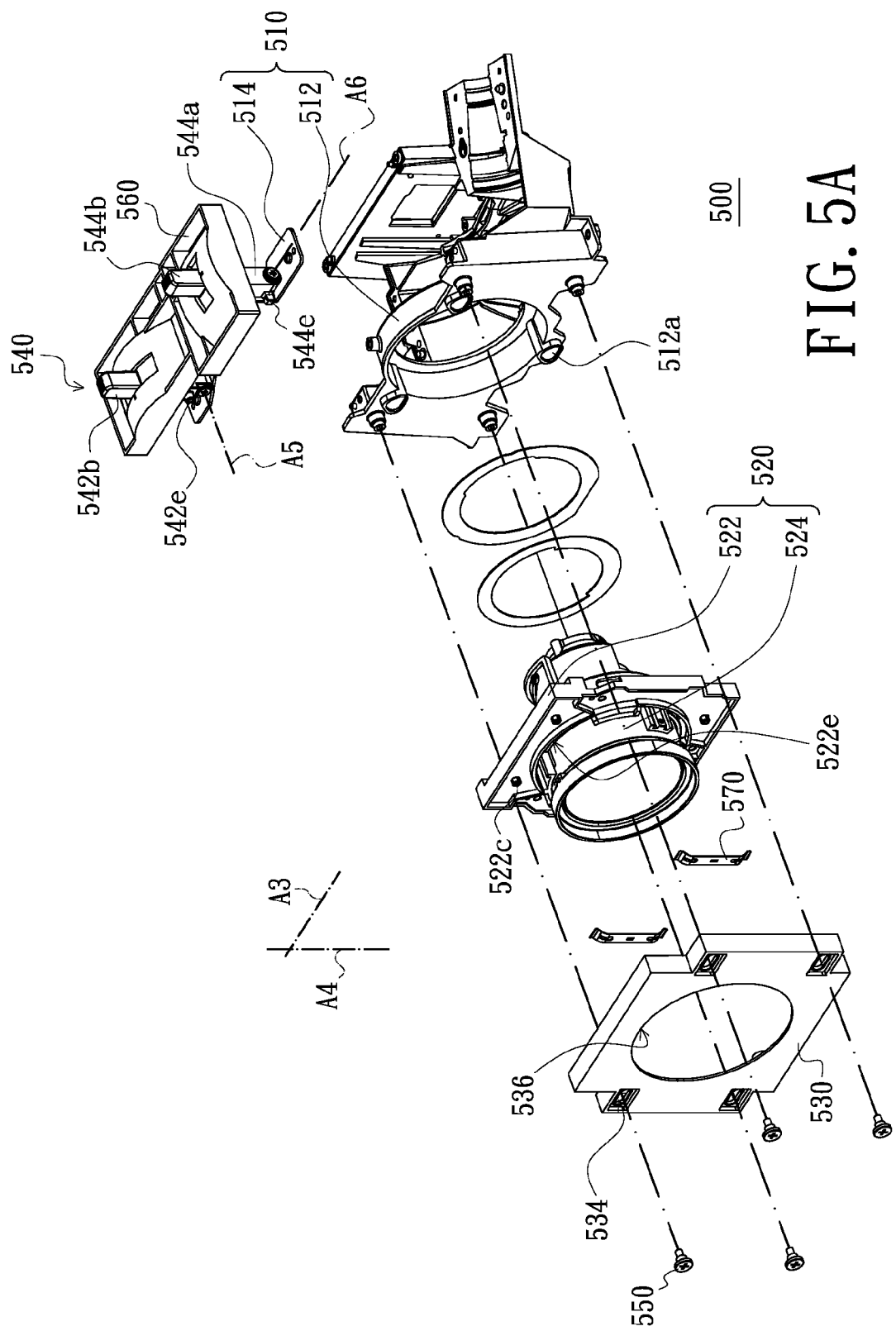

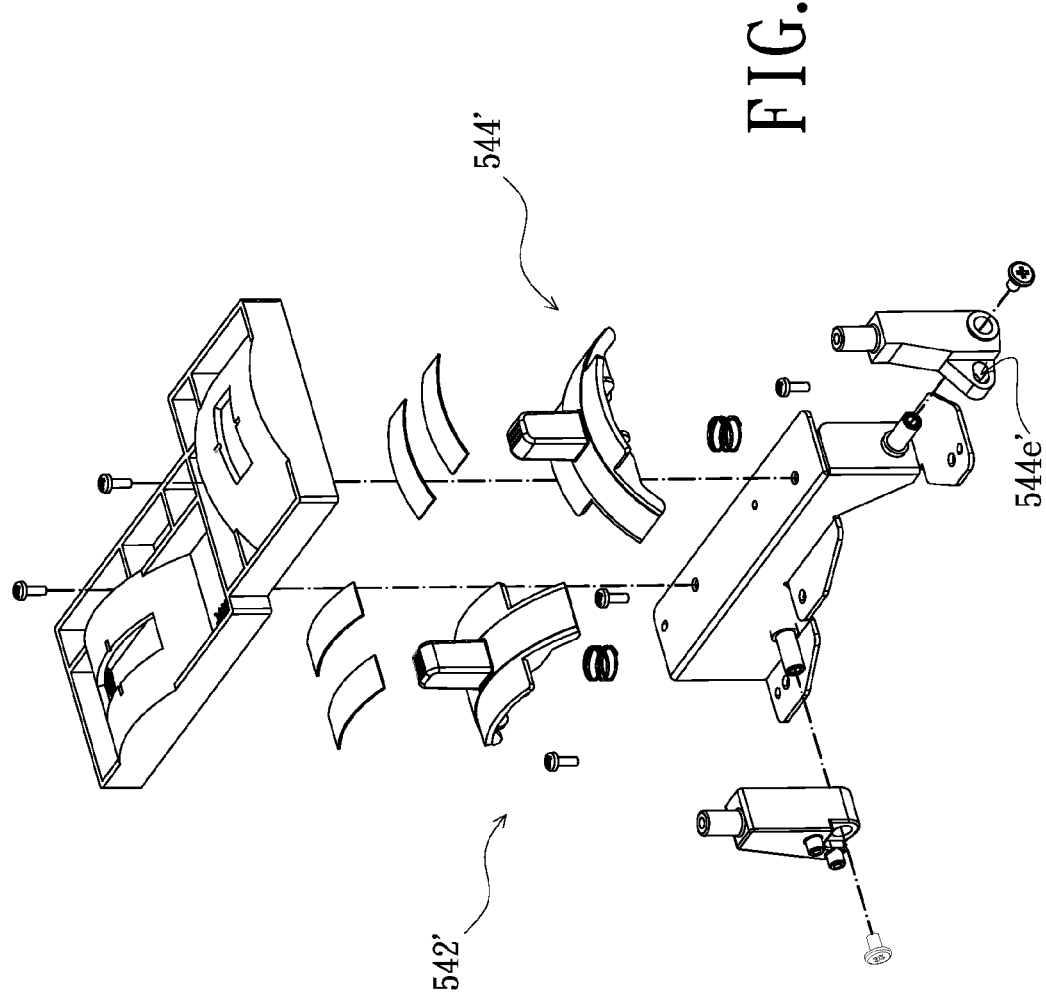

LEVER ACTUATED LENS ADJUSTMENT MODULE

CROSS-REFERENCE TO RELATED APPLICATION

This application claims the priority benefit of China application serial no. CN200910170644.4, filed on Sep. 1, 2009. The entirety of the above-mentioned patent application is incorporated herein by reference and made a part of this specification.

BACKGROUND

1. Field of the Invention

The invention relates to a lens-adjusting module. More particularly, the invention relates to a lens-adjusting module applied to a projector.

2. Description of the Related Art

The design and disposition of the elements inside a projector is closely related to the quality of image projected by the projector. Lens-adjusting modules of projectors are disclosed in many patents. For example, a kind of lens-adjusting module of a projector is disclosed in FIGS. 15 to 23 of the US patent No. 20070058133. Another kind of lens-adjusting module in the present industry is described in the following.

FIG. 1 is a schematic view of a conventional projector. FIG. 2 is a schematic view of the lens-adjusting module of FIG. 1. Referring to FIGS. 1 and 2, the conventional projector P1 includes a lens-adjusting module 100, a light valve 200, an illumination module 300, and a cover 400. The illumination module 300 disposed inside the cover 400 generates an illumination beam 310. The light valve 200 is disposed in the cover 400 and located in the transmission path of the illumination beam 310. The light valve 200 converts the illumination beam 310 into an image beam 210. The lens-adjusting module 100 is disposed in the cover 400 and a lens 170 of the lens-adjusting module 100 is located in the transmission path of the image beam 210 to project the image beam 210 to a screen (not shown).

Referring to FIG. 2, the lens-adjusting module 100 further includes a base 120, two first guiding shaft 130, a first adjusting stand 140, two second guiding shaft 150, and a second adjusting stand 160 besides the lens 170. The first guiding shafts 130 are disposed at the two opposite sides of the base 120 respectively. The first adjusting stand 140 is installed on the first guiding shafts 130. The second guiding shafts 150 are disposed at the two opposite sides of the first adjusting stand 140. The second adjusting stand 160 is installed on the second guiding shafts 150. Each of the first guiding shafts 130 extends along a first axis A1. Each of the second guiding shafts 150 extends along a second axis A2. The first axis A1 is perpendicular to the second axis A2.

The lens 170 is disposed on the second adjusting stand 160. The second adjusting stand 160 of the lens-adjusting module 100 may move along the second axis A2, and the first adjusting stand 140 may move along the first axis A1 such that the lens 170 is adjusted by means of moving the first adjusting stand 140 and the second adjusting stand 160.

According to the lens-adjusting module 100, adjusting the lens 170 is achieved by means of the arrangement of the guiding shafts 130 and 150 and the adjusting stands 140 and 160. However, the arrangement of the elements in the lens-adjusting module 100 may not satisfy another designer having another requirement of space planning for inside of another projector.

In addition, because the guiding shafts 130 and 150 and the first adjusting stand 140 are all disposed between the base 120 and the second adjusting stand 160, the cumulative tolerance between the second adjusting stand 160 and the base 120 is relatively large after the lens-adjusting module 100 is assembled. Accordingly, the predetermined interval between the second adjusting stand 160 and the base 120 is adversely affected by the cumulative tolerance such that an image projected by the lens 170 disposed at the second adjusting stand 160 is out of focus.

BRIEF SUMMARY

The invention is directed to provide a lens-adjusting module, and the arrangement of the elements of the lens-adjusting module may satisfy another designer having another requirement of space planning.

The invention is directed to provide a lens-adjusting module, and the cumulative tolerance of the lens-adjusting module is relatively low after the lens-adjusting module is assembled.

Other advantages and objects of the invention may be further comprehended through the technical features disclosed in the present invention.

In order to achieve at least one of the objectives or other objectives, in an embodiment of the invention, the lens-adjusting module includes a base, a lens device, a second tray, and an adjusting device. The lens device is movably disposed on the base and contacts the base. The lens device includes a first tray and a lens. The first tray is movably disposed on the base and contacts the base. The lens is fixed to the first tray and contacts the first tray. The second tray is movably disposed on the base and contacts the base. The first tray is movably disposed at the second tray. The first tray is located between the second tray and the base. The adjusting device includes a first lever and a second lever. The first lever is pivoted to the base, and a part of the first lever is slidingly disposed on the first tray. The first lever is adapted to rotate to drive the first tray and the second tray such that the first tray and the second tray move together relatively to the base and move along a first axis. The second lever is pivoted to the base and a part of the second lever is slidingly disposed on the first tray. The second lever is adapted to rotate to drive the first tray such that the first tray moves relatively to the second tray and the base and moves along a second axis.

In order to achieve at least one of the objectives or other objectives, in another embodiment of the invention, the lens-adjusting module includes a base, a lens device, a second tray, and an adjusting device. The lens device is movably disposed on the base and contacts the base. The lens device includes a first tray and a lens. The first tray is movably disposed on the base. The lens is fixed to the first tray, contacts the first tray, and contacts the base. The second tray is movably disposed on the base. The first tray is movably disposed on the second tray. The first tray is located between the second tray and the base. The adjusting device includes a first lever and a second lever. The first lever is pivoted to the base and a part of the first lever is slidingly disposed on the first tray. The first lever is adapted to rotate to drive the first tray and the second tray such that the first tray and the second tray move together relatively to the base and move along a first axis. The second lever is pivoted to the base, and a part of the second lever is slidingly disposed on the first tray. The second lever is adapted to rotate to drive the first tray such that the first tray moves relatively to the second tray and the base and moves along a second axis.

Because the arrangement of the elements of the lens-adjusting module of the embodiment of the invention is different from the arrangement of the elements of the lens-adjusting module of the conventional art, a designer may use the lens-adjusting module of the embodiment of the invention according to the designer's requirement of spacing planning. Therefore, the arrangement of the elements of the lens-adjusting module of the embodiment of the invention may satisfy another designer having another requirement of space planning.

In addition, because the lens device of the lens-adjusting module of the embodiment of the invention is movably disposed on the base and contacts the base, compared with the conventional art, the cumulative tolerance between the lens of the lens device and the base is reduced after the lens-adjusting module is assembled. Accordingly, the predetermined interval between the lens device and the base is comparatively not adversely affected by the cumulative tolerance such that an image projected by the lens disposed at the first tray is comparatively not out of focus.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute part of this specification. The drawings illustrate embodiments of the invention and, together with the description, serve to explain the principles of the invention.

FIG. 5A is a schematic explosion view of the lens-adjusting module of FIG. 4.

FIG. 14 is a schematic explosion view of the adjusting device, the base, and the shell of FIG. 11A.

DETAILED DESCRIPTION

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

First Embodiment

Figure 1:
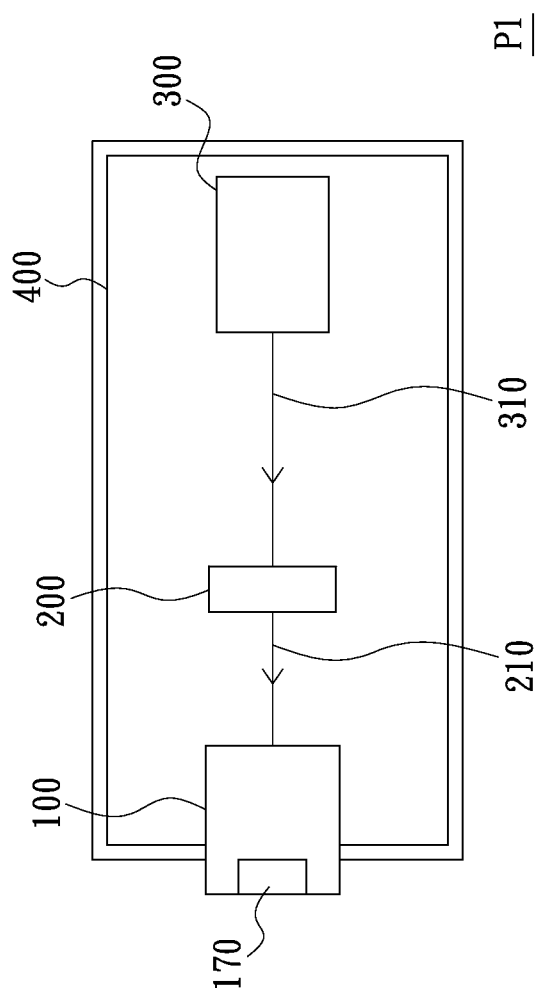
FIG. 1 is a schematic view of a conventional projector.
Figure 2:
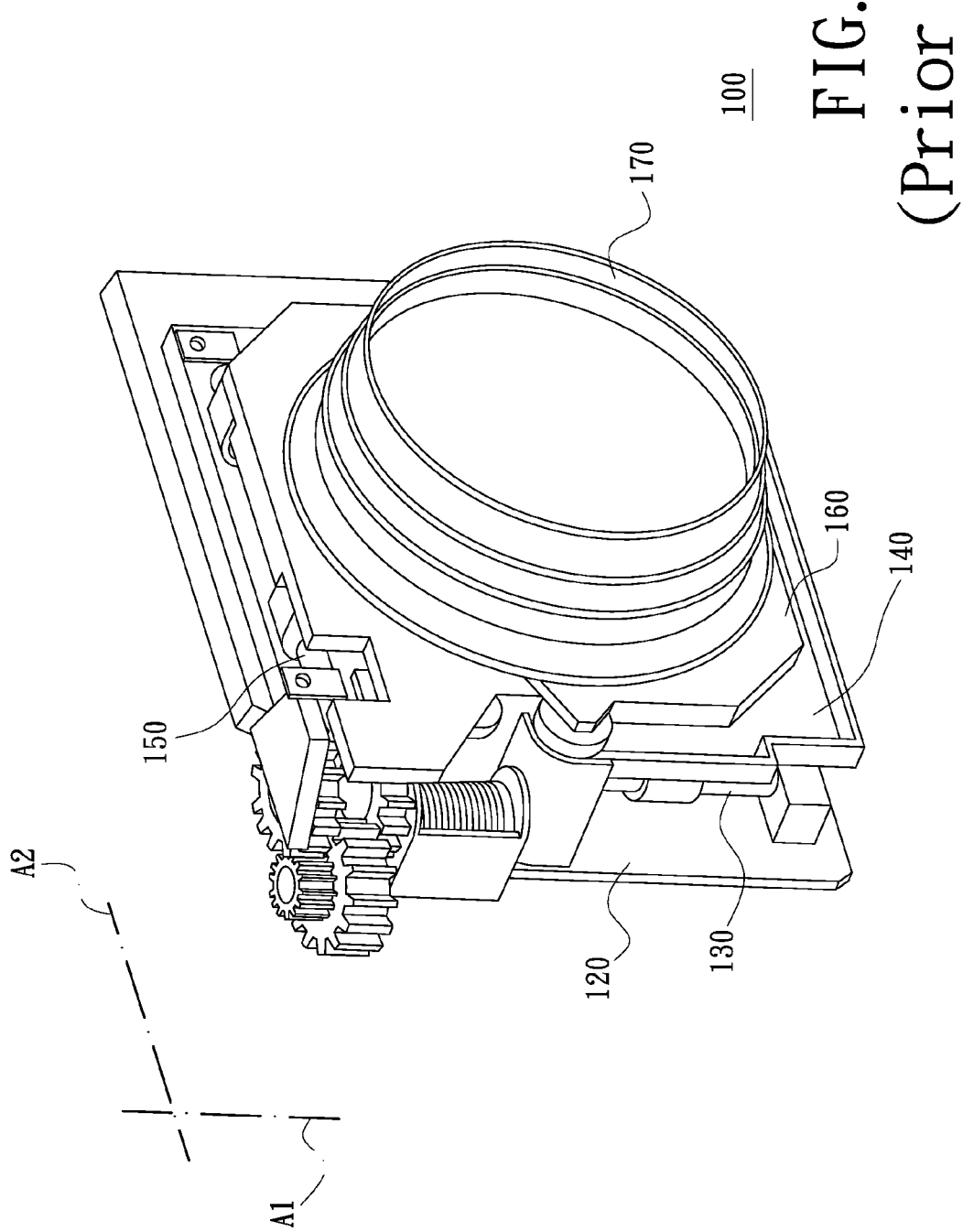
FIG. 2 is a schematic view of the lens-adjusting module of FIG. 1.
Figure 3:
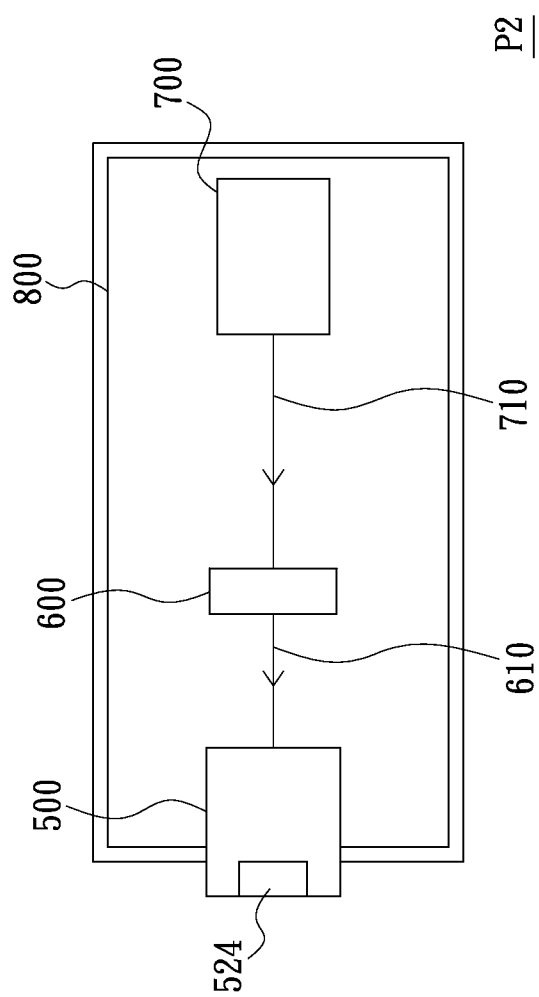
FIG. 3 is a schematic view of a projector of a first embodiment of the invention.
Figure 4:
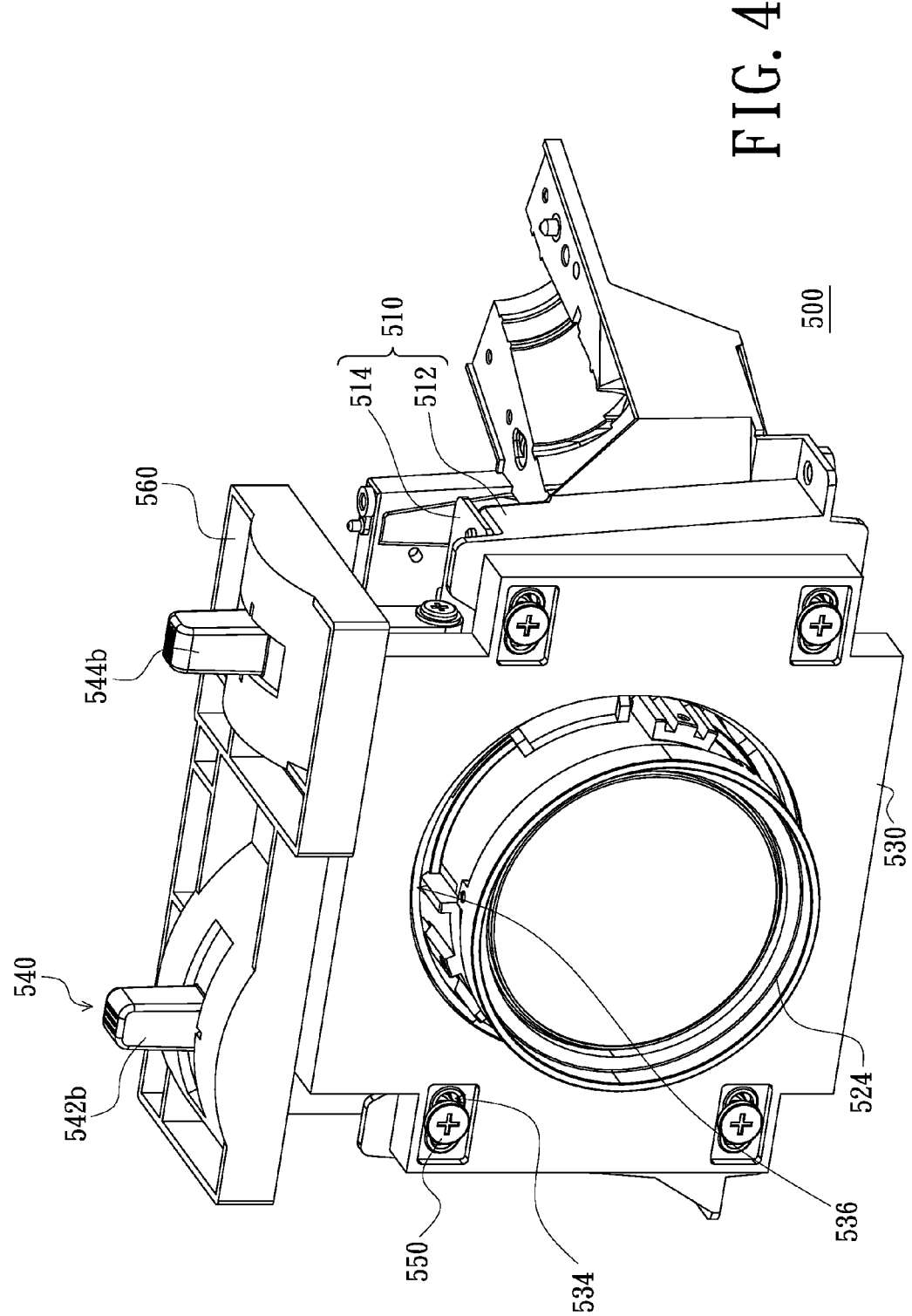
FIG. 4 is a schematic assembly view of the lens-adjusting module of FIG. 3.
Figure 5B:
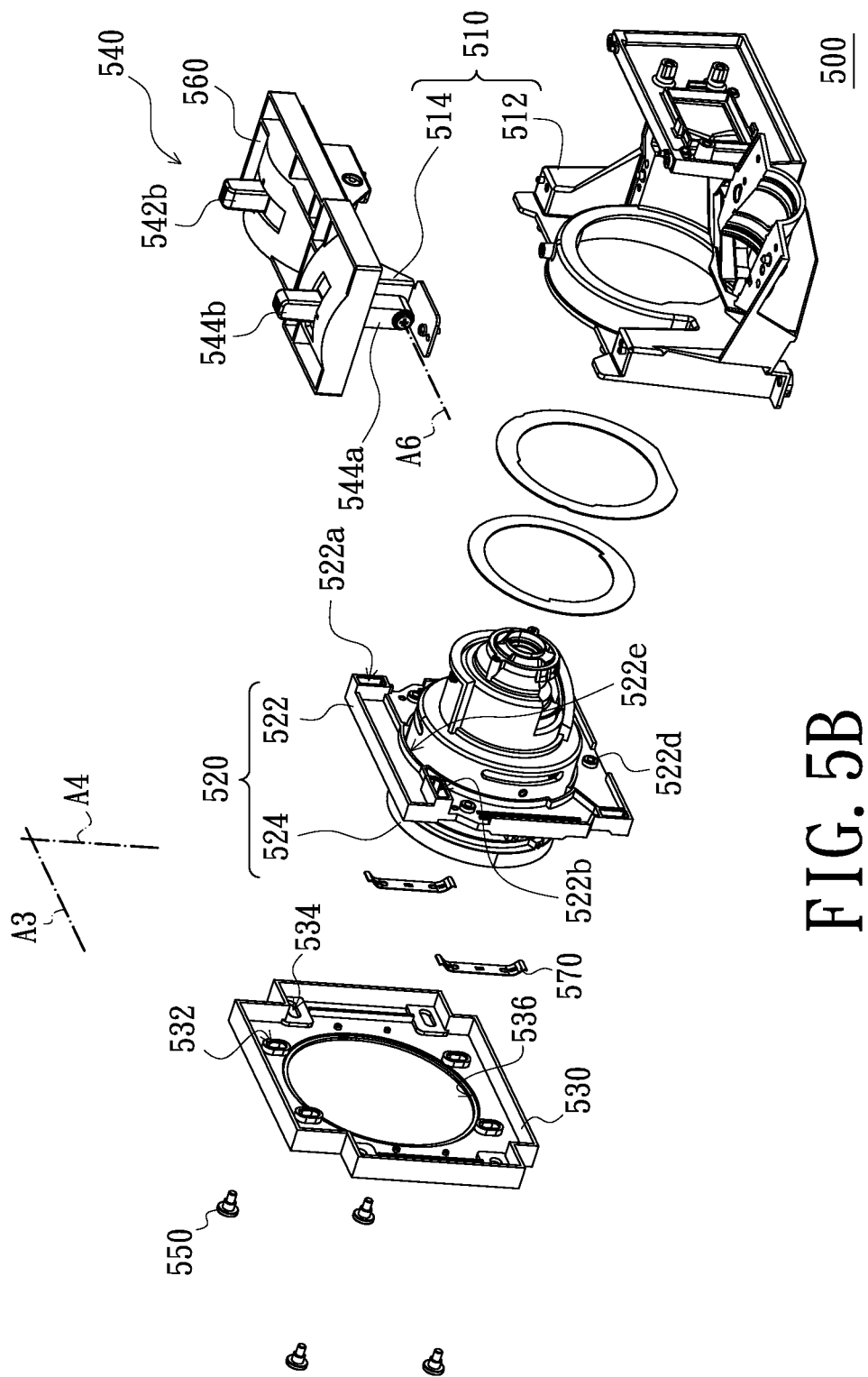
FIG. 5B is another schematic explosion view of the lens-adjusting module of FIG. 4.
Figure 6:
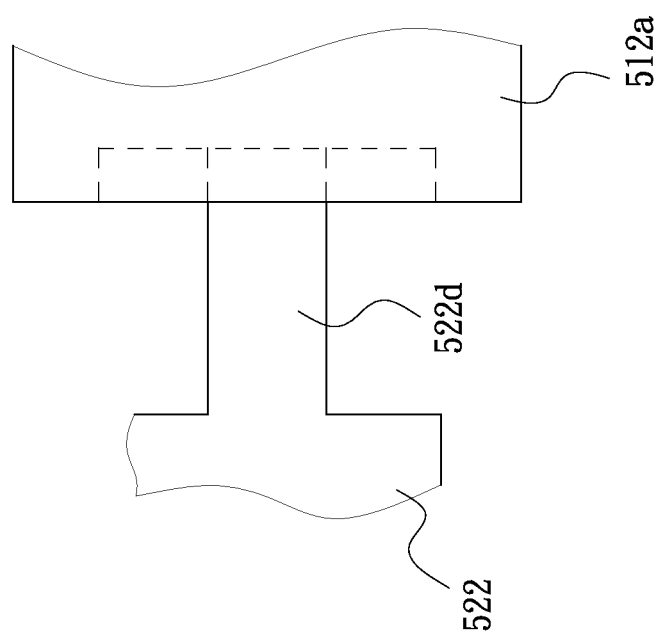
FIG. 6 is a schematic view showing the disposition of the first tray and the base of FIG. 4.
Figure 7A:
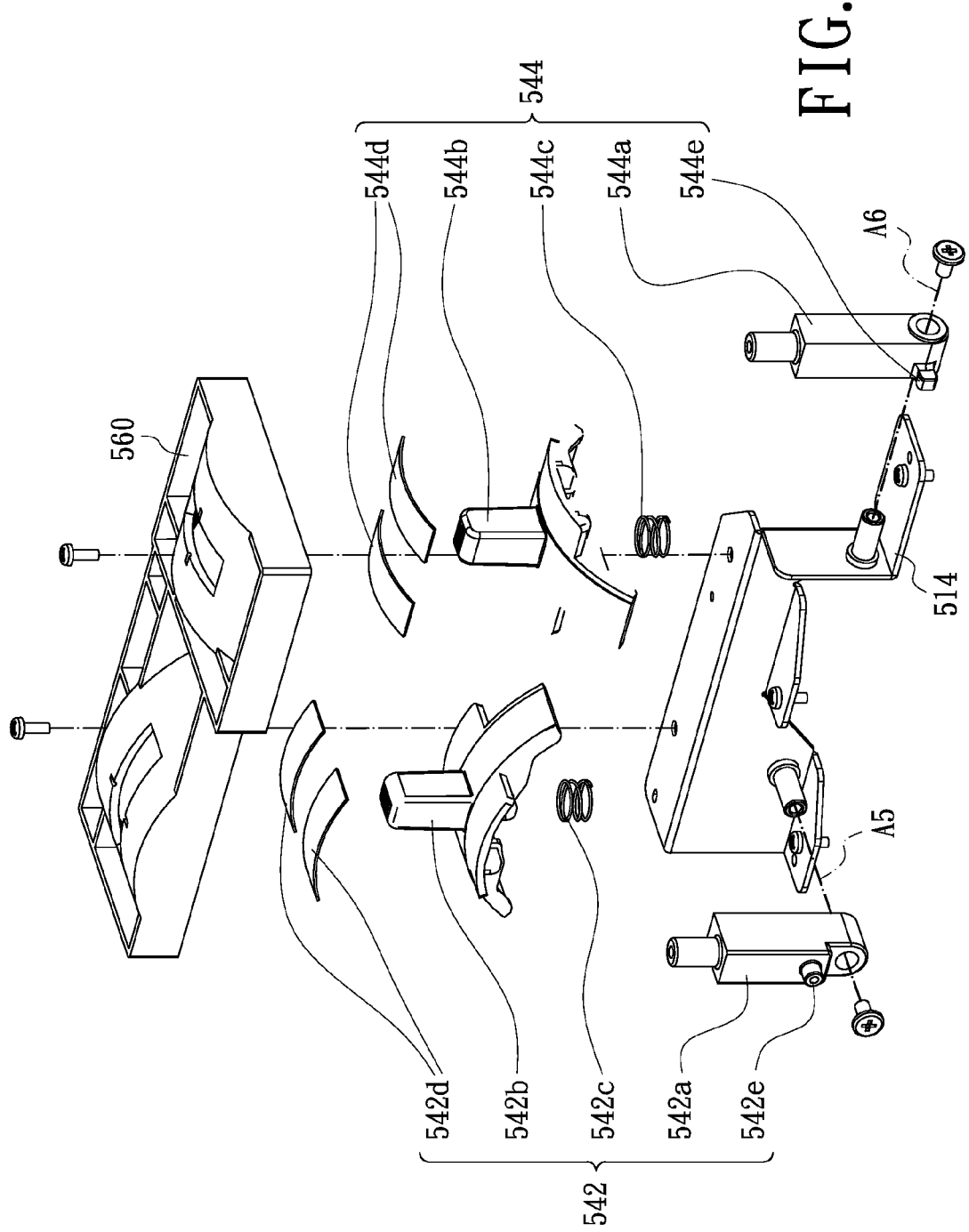
FIG. 7A is a schematic explosion view of the adjusting device, the base, and the shell of FIG. 5A.
Figure 7B:
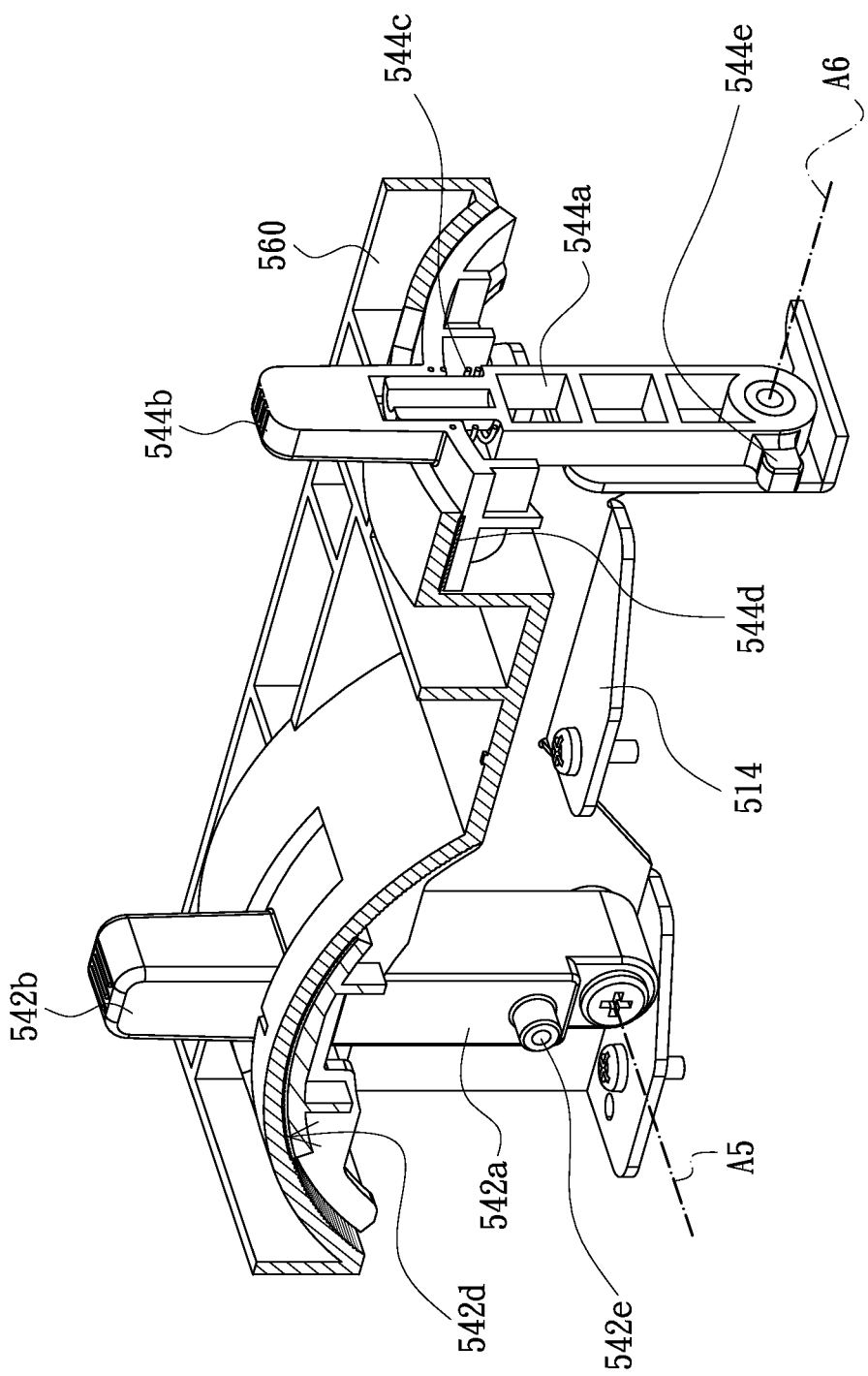
FIG. 7B is a schematic cross-sectional assembly view of the adjusting device, the base, and the shell of FIG. 5A.

Referring to FIG. 3, the projector P2 of the embodiment includes a lens-adjusting module 500, a light valve 600, an illumination module 700, and a cover 800. The illumination module 700 disposed in the cover 800 generates an illumination beam 710. The light valve 600 is disposed in the cover 800 and located in the transmission path of the illumination beam 710. The light valve 600 converts the illumination beam 710 into an image beam 610. The lens-adjusting module 500 is disposed in the cover 800, and a lens 524 of the lens-adjusting module 500 is located in the transmission path of the image beam 610 to project the image beam 610 to a screen (not shown).

Referring to FIGS. 4, 5A, 5B, and 6, the lens-adjusting module 500 includes a base 510, a lens device 520, a second tray 530, an adjusting device 540, a plurality of second sliding blocks 550, a shell 560, and at least one elastic piece 570. The base 510 includes a first base body 512 and a second base body 514. The second base body 514 is fixed to the first base body 512, and the first base body 512 has a plurality of contact portions 512a.

The lens device 520 includes a first tray 522 and the lens 524. The first tray 522 has a first sliding trench 522a, a second sliding trench 522b, a plurality of first sliding blocks 522c, and a plurality of third sliding blocks 522d. The first sliding trench 522a of the first tray 522 extends along a second axis A4. The second sliding trench 522b of the first tray 522 extends along a first axis A3. The first axis A3 is perpendicular to the second axis A4. In addition, the third sliding blocks 522d are slidingly disposed on the contact portions 512a respectively such that the first tray 522 is movably disposed on the first base body 512 of the base 510 and contacts the first base body 512 of the base 510. The lens 524 is fixed to the first tray 522 and contacts the first tray 522.

The second tray 530 has a plurality of third sliding trenches 532 and a plurality of fourth sliding trenches 534. Each of the third sliding trenches 532 extends along the second axis A4. Each of the fourth sliding trenches 534 extends along the first axis A3. The first sliding blocks 522c of the first tray 522 are slidingly disposed on the third sliding trenches 532 respectively such that the first tray 522 is movably disposed on the second tray 530. In addition, in the embodiment, the lens 524 passes through a first opening 536 of the second tray 530 and a second opening 522e of the first tray 522.

The second sliding blocks 550 of the lens-adjusting module 500, such as screws, pass through the fourth sliding trenches 534 respectively to be fixed to the first base body 512 of the base 510, such that the second tray 530 is movably disposed on the base 510 and contacts the base 510, and such that the second tray 530 and the first base body 512 of the base 510 clamps the first tray 522. To sum up, the first tray 522 is located between the second tray 530 and the base 510.

The elastic pieces 570 are disposed between the first tray 522 and the second tray 530 to reduce the friction between the first tray 522 and the second tray 530. The elastic pieces 570 may exert force on the first tray 522 such that the first tray 522 lean closely against the contact portions 512a of the first base body 512 of the base 510. Accordingly, the assembly tolerance between the first tray 522 and the contact portions 512a of the first base body 512 is reduced, and the parallelism of the lens-adjusting module 500 is improved.

Figure 8:
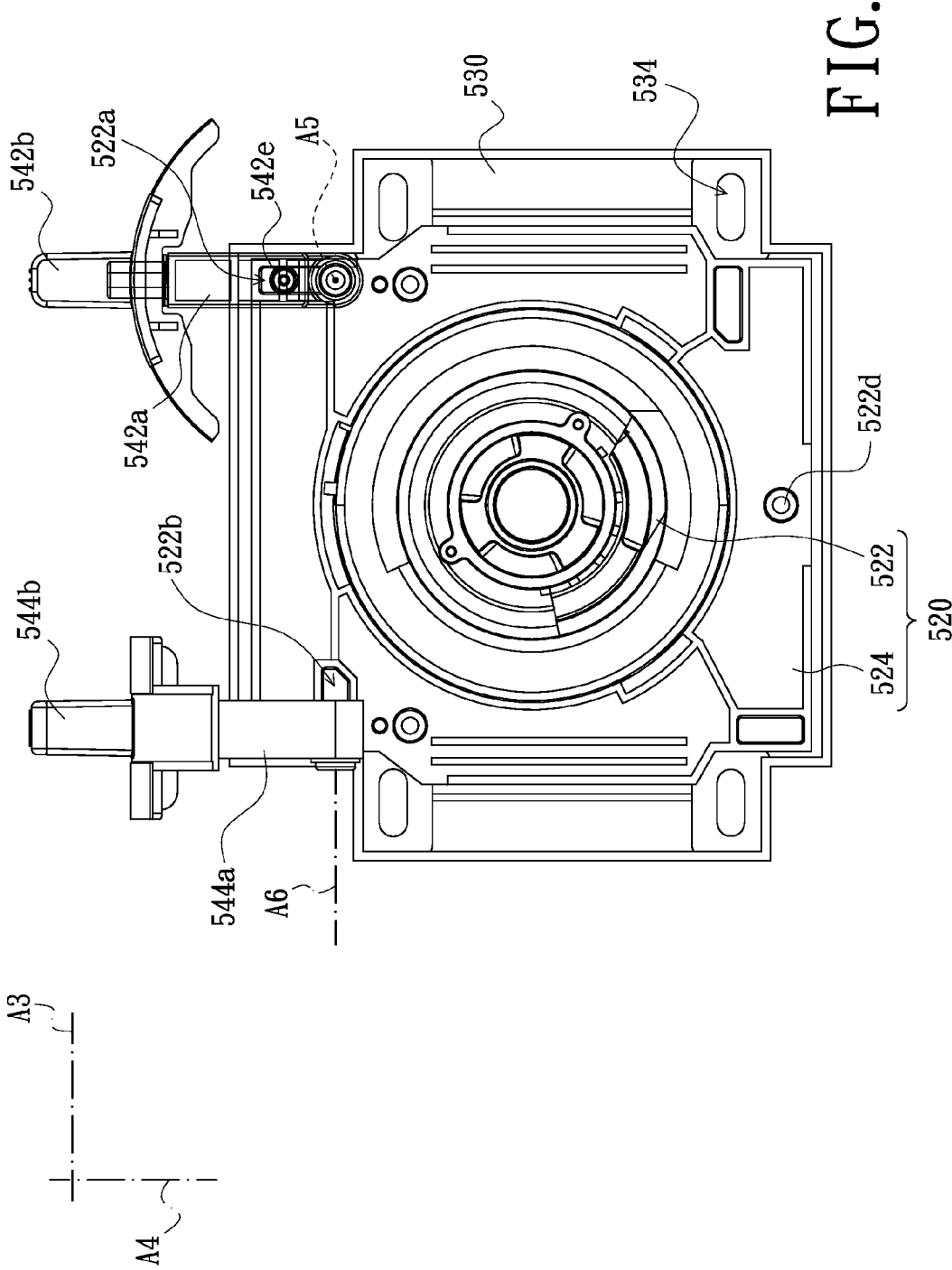
FIG. 8 is a schematic view showing the connection between the adjusting device and the first tray of FIG. 5A.

For the convenience of description, outlines of the elements of the adjusting device 540 and the connection between the adjusting device 540 and the first tray 522 are schematically shown in FIG. 8 according to the viewing direction from the base 510 to the lens 530. Referring to FIGS. 4, 5A, 5B, 7A, 7B, and 8, the adjusting device 540 is disposed on the second base body 514 of the base 510 and partially covered by the shell 560 fixed to the second base body 514. The adjusting device 540 includes a first lever 542 and a second lever 544. The first lever 542 is pivoted to the second base body 514 of the base 510, and the second lever 544 is pivoted to the second base body 514 of the base 510. A part of the first lever 542 is slidingly disposed on the first tray 522, and a part of the second lever 544 is slidingly disposed on the first tray 522.

Particularly, the first lever 542 includes a first lever body 542a, a second lever body 542b, a first elastic element 542c, a first non-skid element 542d, and a first column 542e. The first lever body 542a is pivoted to the second base body 514 of the base 510. The first column 542e disposed on the first lever body 542a is slidingly disposed on the first sliding trench 522a of the first tray 522. The first elastic element 542c connects the first lever body 542a and the second lever body 542b. The first non-skid element 542d is disposed between the second lever body 542b and the shell 560. The first elastic element 542c exerts a first prestressing force on the second lever body 542b such that the first non-skid element 542d contacts the shell 560.

The second lever 544 includes a third lever body 544a, a fourth lever body 544b, a second elastic element 544c, a second non-skid element 544d, and a second column 544e. The third lever body 544a is pivoted to the second base body 514 of the base 510. The second column 544e disposed on the third lever body 544a is slidingly disposed on the second sliding trench 522b of the first tray 522. The second elastic element 544c connects the third lever body 544a and the fourth lever body 544b. The second non-skid element 544d is disposed between the fourth lever body 544b and the shell 560. The second elastic element 544c exerts a second prestressing force on the fourth lever body 544b such that the second non-skid element 544d contacts the shell 560.

In the embodiment, the first lever 542 is adapted to rotate about a first axle center line A5. The second lever 544 is adapted to rotate about a second axle center line A6. The first axis A3 is parallel to the second axle center line A6. The first axle center line A5 is perpendicular to the first axis A3 and the second axis A4.

Because the arrangement of the elements of the lens-adjusting module 500 is different from the arrangement of the elements in the lens-adjusting module 100 of the conventional art, a designer may adopt the lens-adjusting module 500 according to the designer's requirement of spacing planning. Therefore, the arrangement of the elements in the lens-adjusting module 500 may satisfy another designer having another requirement of space planning.

In addition, because the lens 524 may be disposed on the first tray 522 to contact the first tray 522, and the first tray 522 may be disposed on the base 510 to contact the base 510, compared with the conventional art, the cumulative tolerance between the lens 524 of the lens device 520 and the base 510 is reduced after the lens-adjusting module 500 is assembled. Therefore, the predetermined interval between the lens device 520 and the base 510 is comparatively not adversely affected by the cumulative tolerance such that an image projected by the lens 524 disposed on the first tray 522 is comparatively not out of focus.

The operation of the lens-adjusting module 500 is described in the following. Referring to FIGS. 4 to 8, when a user presses the second lever body 542b of the first lever 542 such that the second lever body 542b moves along the second axis A4 and the first non-skid element 542d does not contact the shell 560, and when the user rotates the first lever 542, the first column 542e of the first lever 542 drives the first tray 522 and the second tray 530 such that the first tray 522 and the second tray 524 move together relatively to the base 510 and move along the first axis A3. At this time, each of the fourth sliding trenches 534 moves relatively to the corresponding second sliding block 550. When the user rotates the first lever 542 to an adequate position through the above-mentioned process, the user may relieve the above-mentioned pressure such that the first non-skid element 542d contacts the shell 560 again to fix the position of the first lever 542 relative to the second base body 514 of the base 510.

When the user presses the fourth lever body 544b of the second lever 544 such that the fourth lever body 544b moves along the second axis A4 and the second non-skid element 544d does not contact the shell 560, and when the user rotates the second lever 544, the second column 544e of the second lever 544 drives the first tray 522 such that the first tray 522 moves relatively to the second tray 530 and the base 510 and moves along the second axis A4. At this time, the elastic pieces 570 disposed between the first tray 522 and the second tray 530 may reduce the friction between the first tray 522 and the second tray 530 such that the first tray 522 may be moved easily along the second axis A4. At this time, each of the first sliding blocks 522c moves relatively to the corresponding third sliding trench 532 and the first sliding trench 522a also moves relatively to the first column 542e of the first lever 542. When the user rotates the second lever 544 to an adequate position through the above-mentioned process, the user may relieve the above-mentioned pressure such that the second non-skid element 544d contacts the shell 560 again to fix the position of the second lever 544 relative to the second base body 514 of the base 510.

Based on the mentioned above, the user may rotate the first lever 542 or the second lever 544 such that the lens 524 may be adjusted by the user to move along the first axis A3 or the second axis A4.

Figure 9A:
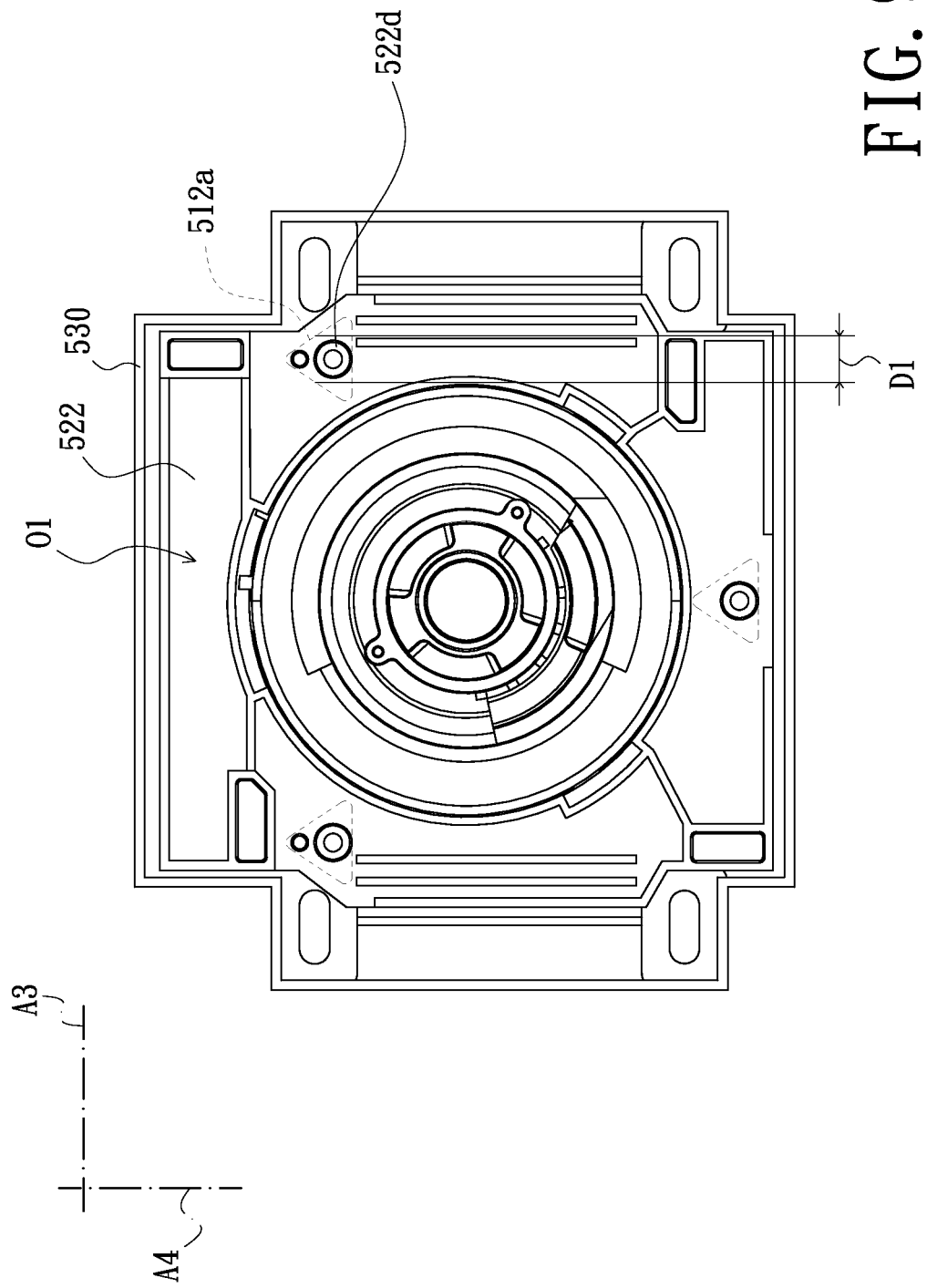
FIG. 9A is a schematic view showing that the first tray of the first embodiment is at a first position relative to the second tray.
Figure 9B:
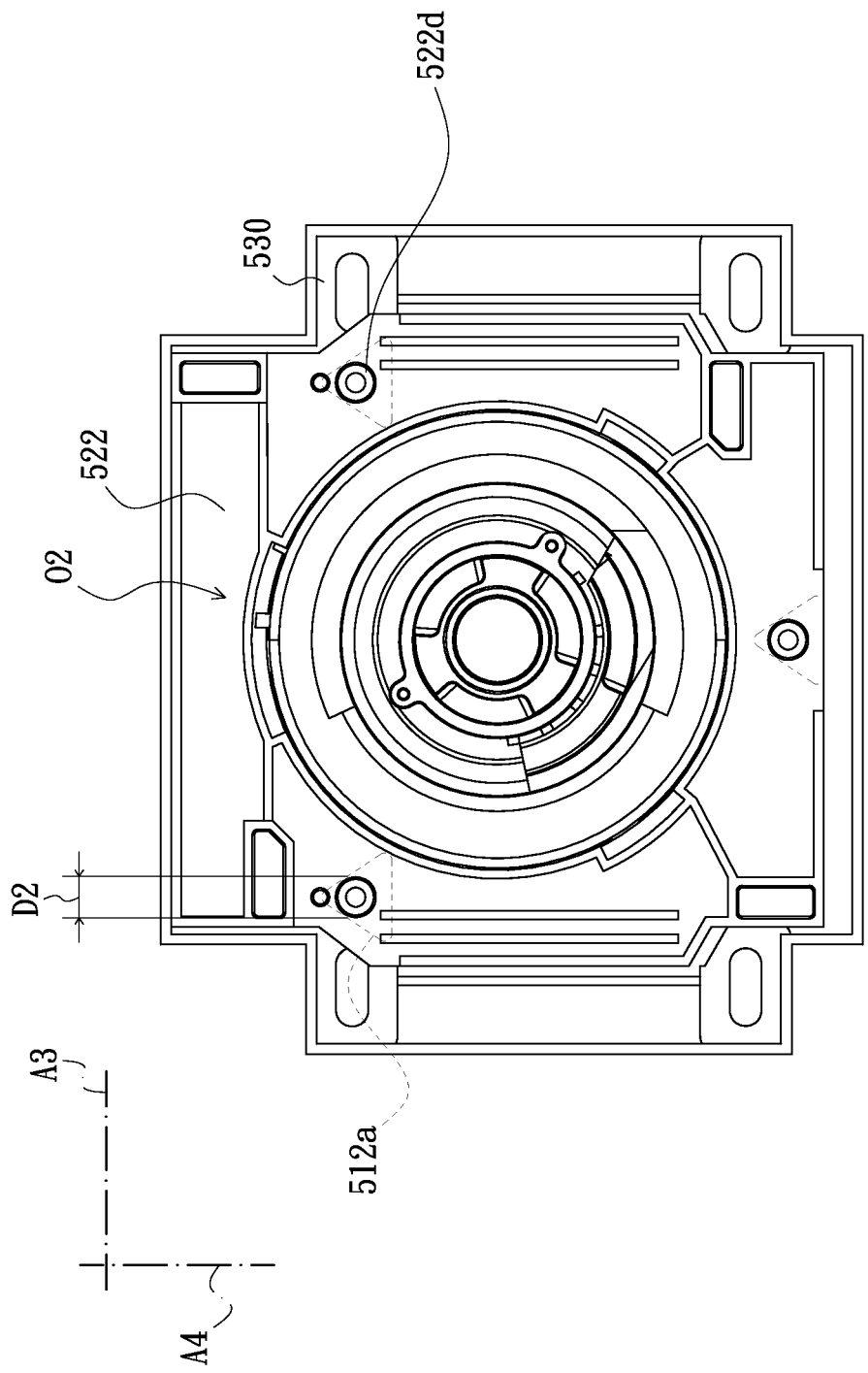
FIG. 9B is a schematic view showing that the first tray of the first embodiment is at a second position relative to the second tray.
Figure 10:
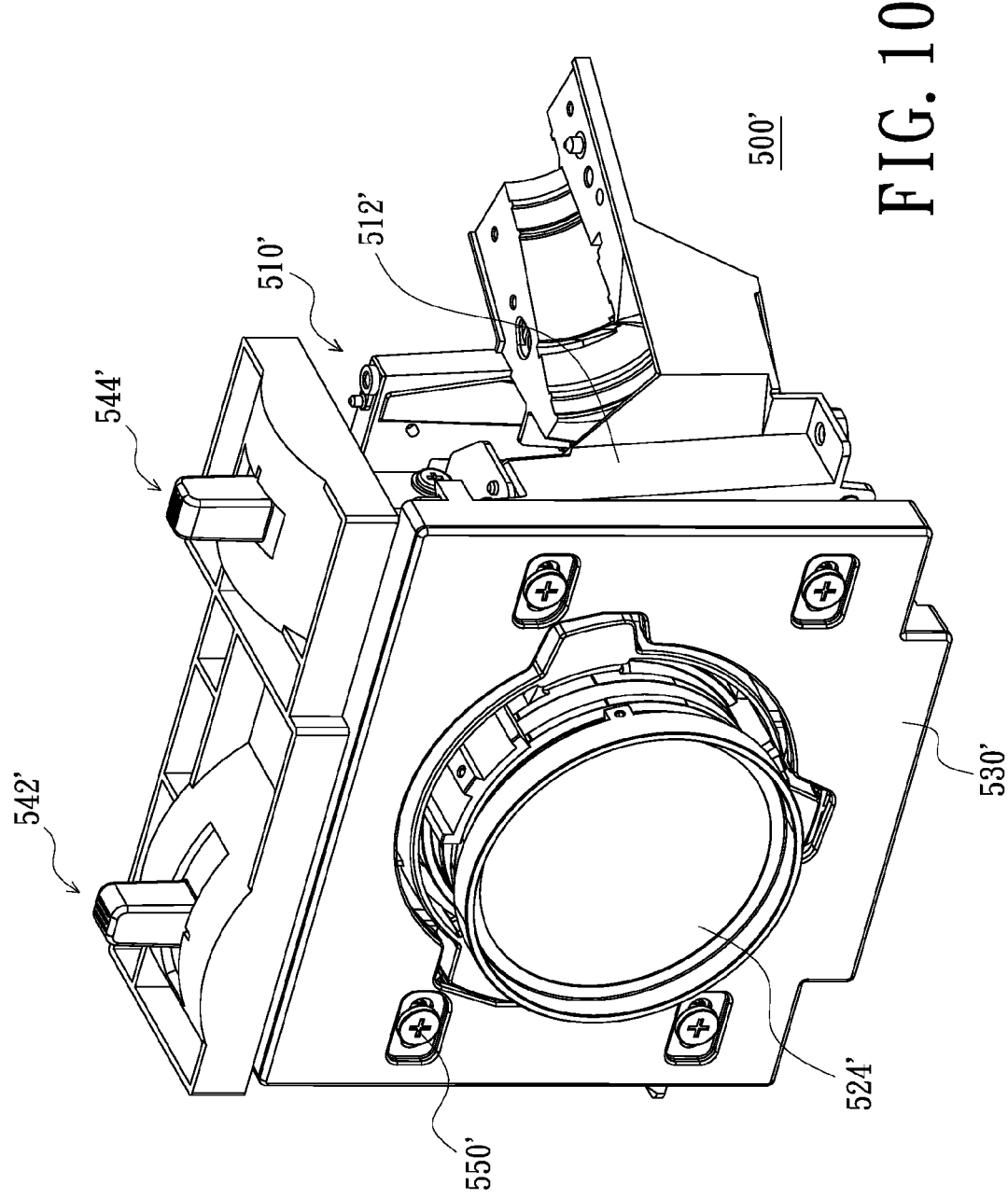
FIG. 10 is a schematic assembly view of a lens-adjusting module of a second embodiment of the invention.
Figure 11A:
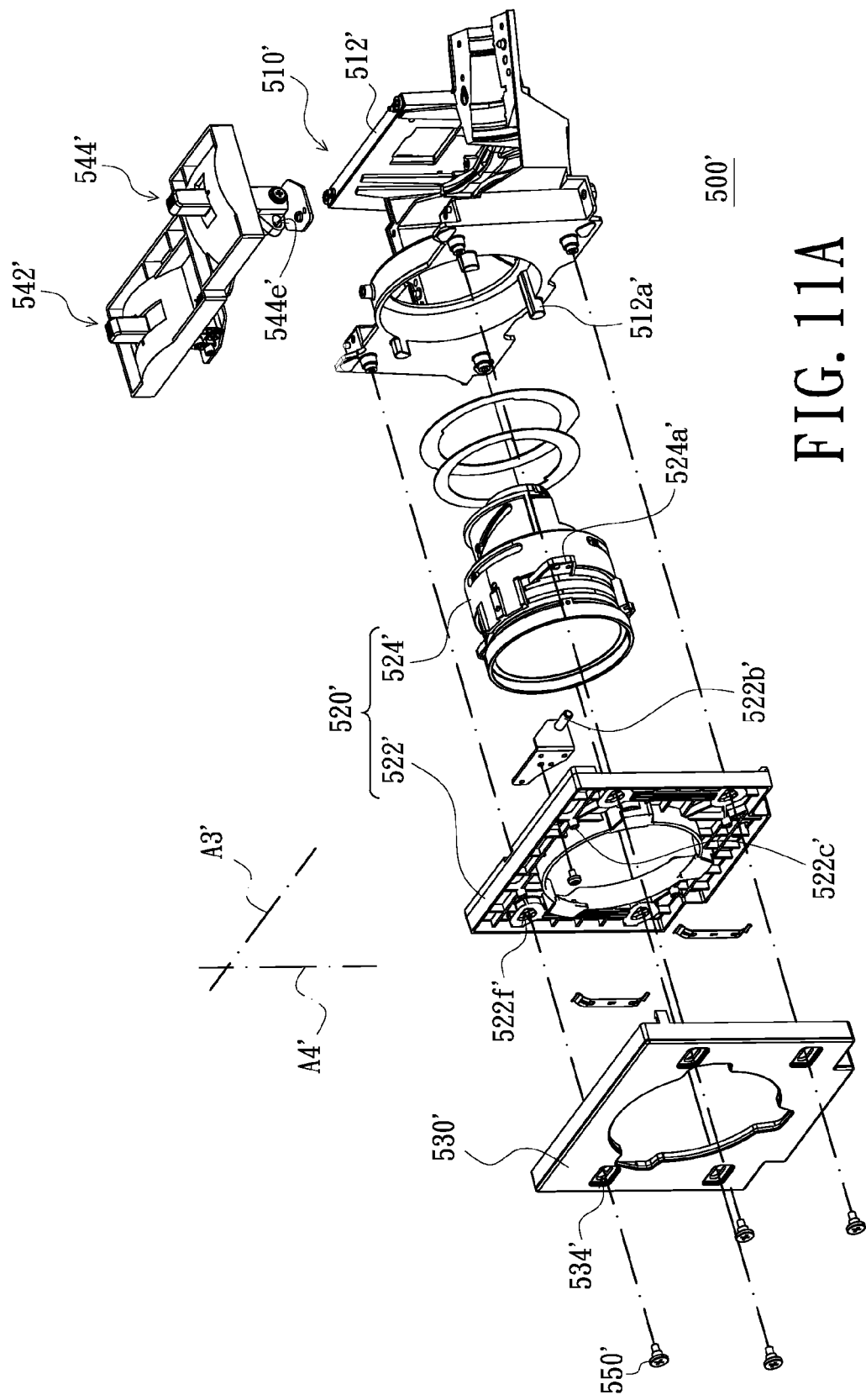
FIG. 11A is a schematic explosion view of the lens-adjusting module of FIG. 10.
Figure 11B:
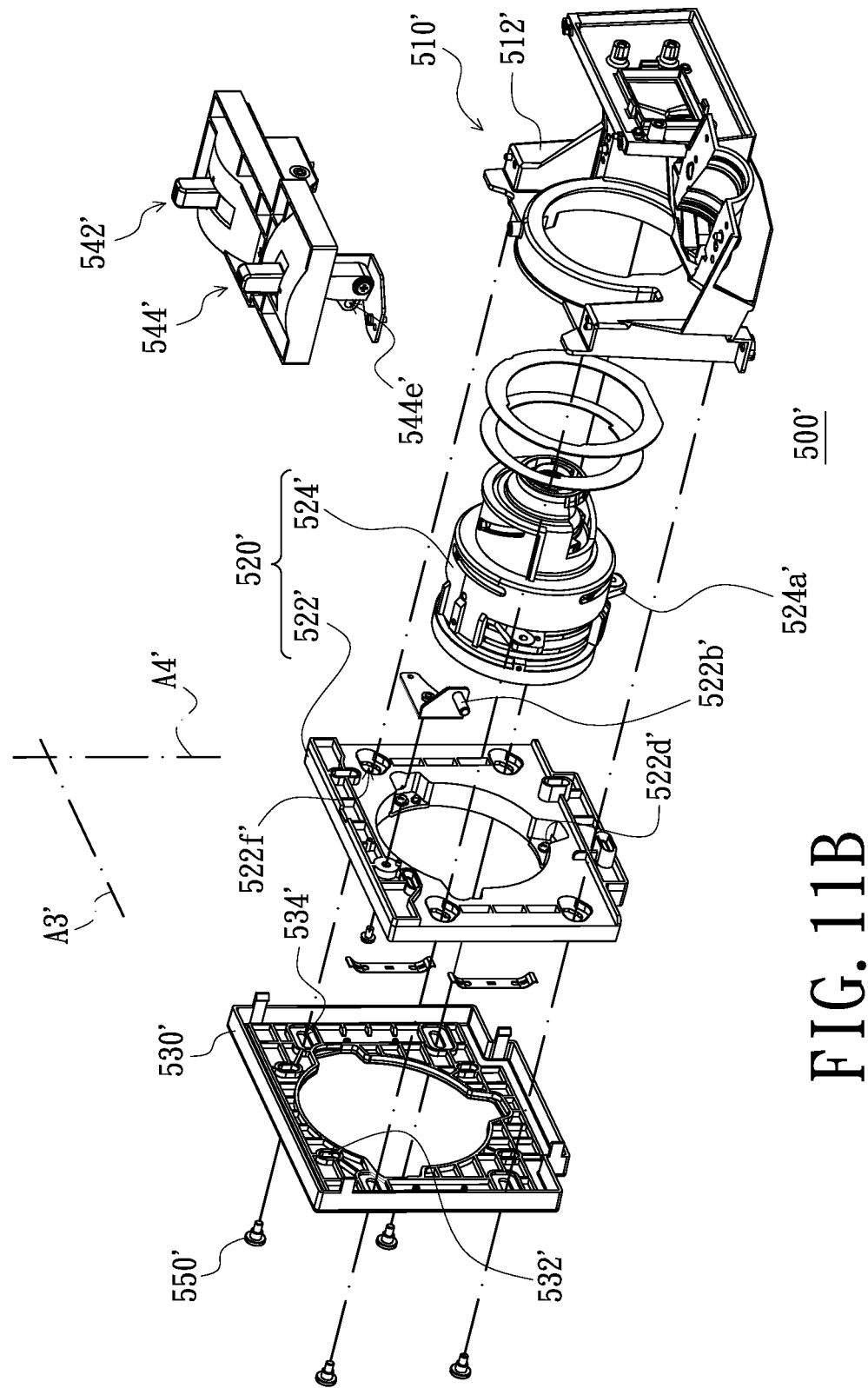
FIG. 11B is another schematic explosion view of the lens-adjusting module of FIG. 10.
Figure 12:
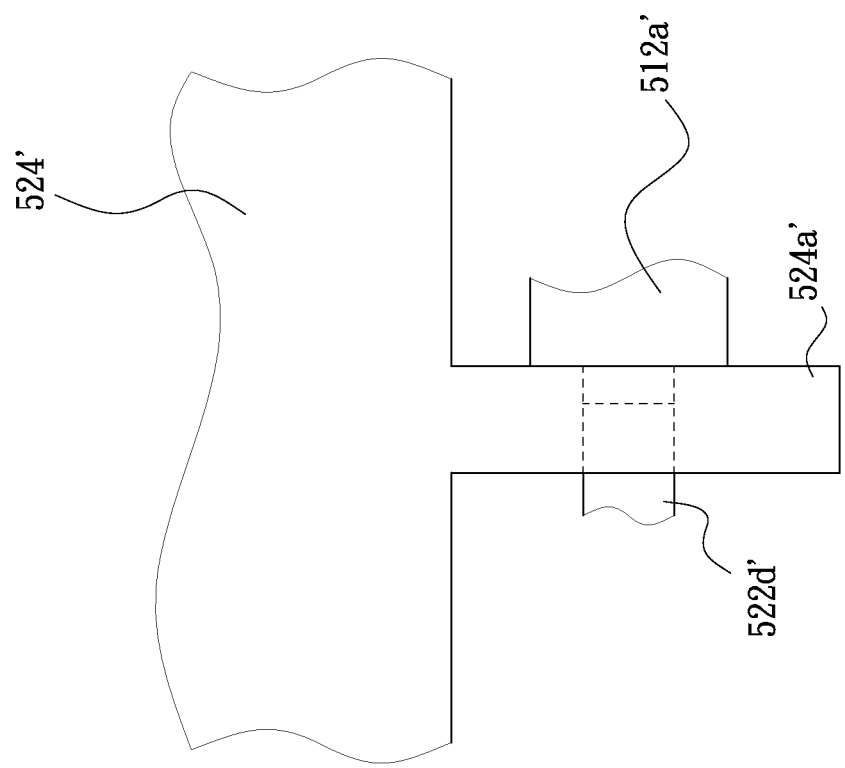
FIG. 12 is a schematic view showing the disposition of the first tray, the lens, and the base of FIG. 10.
Figure 13:
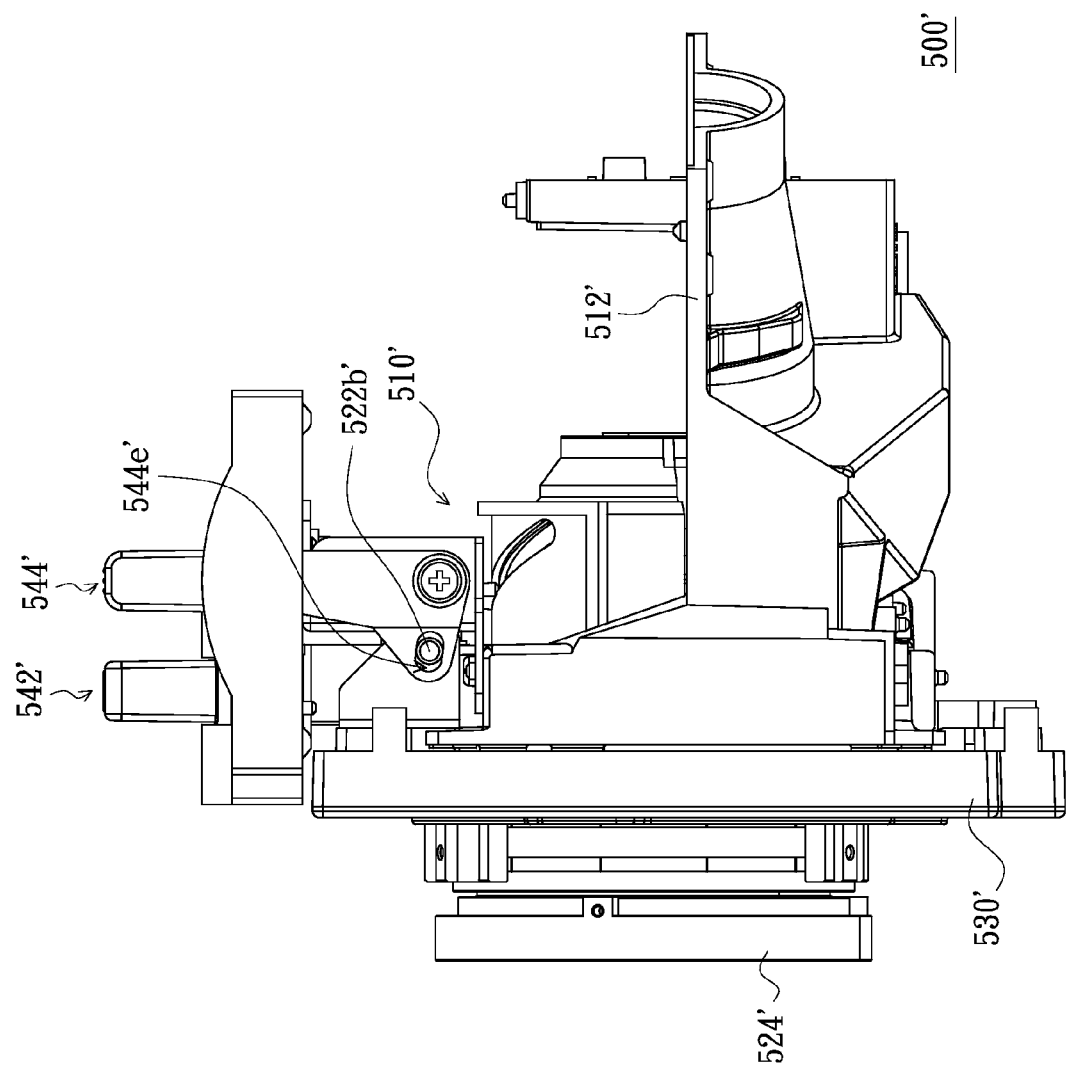
FIG. 13 is a schematic side view of the lens-adjusting module of FIG. 10.

For the convenience of description, the contact portions 512a in FIGS. 9A and 9B are shown by means of dotted lines. Referring to FIGS. 9A and 9B, when the first tray 522 is located at a first position O1 relative to the second tray 530, the first tray 522 limited by the contact portions 512a has a first move distance D1 along the first axis A3. When the first tray 522 is located at a second position O2 relative to the second tray 530, the first tray 522 limited by the contact portions 512a has a second move distance D2 along the first axis A3. The first move distance D1 is different from the second move distance D2. In another embodiment, a designer may change the shape of each of the contact portions 512a to be another shape, for example a rectangle, such that the first move distance D1 is the same as the second move distance D2, but the mentioned above is not shown in any drawing.

Second Embodiment

Referring to FIGS. 10 to 14, the difference between the lens-adjusting module 500' of the embodiment and the lens-adjusting module 500 of the first embodiment lies in that the disposition of the first tray 522', the lens 524', and the second tray 530' in the embodiment is different from the disposition of the first tray 522, the lens 524, and the second tray 530 in the first embodiment. In addition, the shape and the disposition of the second lever 544' in the embodiment are different from the shape and the disposition of the second lever 544 in the first embodiment.

The first tray 522' of the lens device 520' of the embodiment is movably disposed on the first base body 512' of the base 510'. The lens 524' of the lens device 520' is fixed to the first tray 522', contacts the first tray 522', and contacts the first base body 512' of the base 510'. Particularly, the first tray 522' has a plurality of third sliding blocks 522d'. The lens 524' has a plurality of first contact portions 524a'. The first base body 512' of the base 510' has a plurality of second contact portions 512a'. The third sliding blocks 522d' are disposed on the first contact portions 524a' respectively. The first contact portions 524a' are slidingly disposed on the second contact portions 512a' respectively such that the first tray 522' is movably disposed on the first base body 512' of the base 510'.

The first sliding blocks 522c' of the first tray 522' are slidingly disposed on the third sliding trenches 532' of the second tray 530 respectively such that the first tray 522' is movably disposed on the second tray 530. The fourth sliding trenches 534' of the second tray 530' are respectively corresponding to a plurality of holes 522f of the first tray 522'. The second sliding blocks 550' of the lens-adjusting module 500', such as screws, pass through the fourth sliding trenches 534' and the holes 522f respectively to be fixed to the first base body 512' of the base 510' such that the first tray 522' and the second tray 530' are movably disposed on the first base body 512' of the base 510' and such that the second tray 530' and the base 510' clamps the first tray 522'.

The first tray 522' of the embodiment further includes a second column 522b', and the second lever 544' has a second sliding trench 544e', such as an arc-shaped sliding trench. In addition, the second column 522b' is slidingly disposed on the second sliding trench 544e'. The first lever 542' is adapted to rotate to drive the first tray 522' and the second tray 530' such that the first tray 522' and the second tray 530' move together relatively to the base 510' and move along the first axis A3'. The second lever 544' is adapted to rotate to drive the first tray 522' such that the first tray 522' moves relatively to the second tray 530' and the base 510' and moves along the second axis A4'. The operation of the first lever 542' and the operation of the second lever 544' of the embodiment may be referred to the operation of the first lever 542 and the operation of the second lever 544 of the first embodiment, and the description is omitted herein.

To sum up, referring FIGS. 5A, 5B, 8, 11A, 11B, and 13, in the first embodiment, the second column 544e of the second lever 544 is slidingly disposed at the second sliding trench 522b of the first tray 522. However, in the second embodiment, the second column 522b' of the first tray 522' may be designed to be slidingly disposed at the second sliding trench 544e' of the second lever 544'.

Figure 15A:
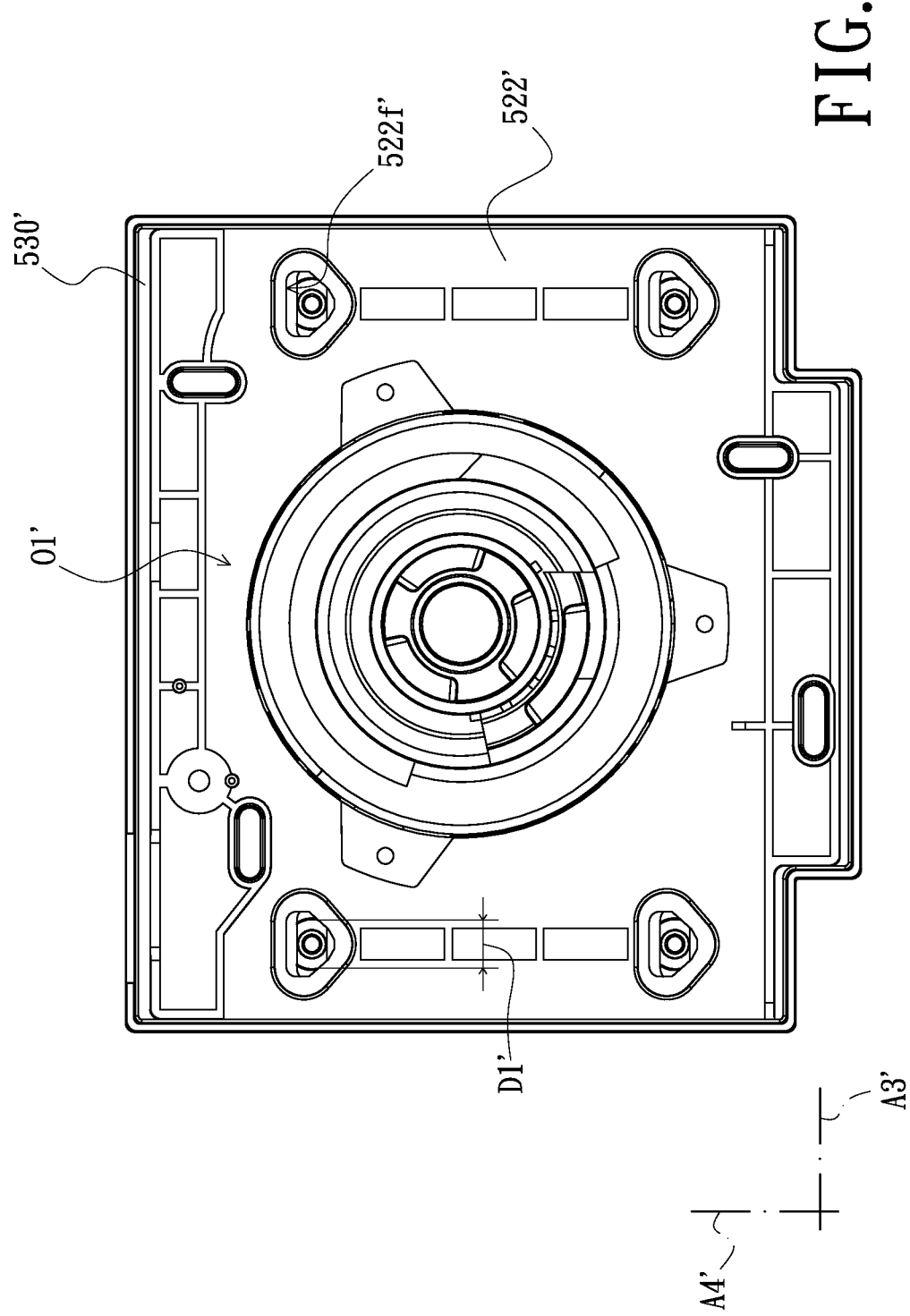
FIG. 15A is a schematic view showing that the first tray of the second embodiment is at a first position relative to the second tray.
Figure 15B:
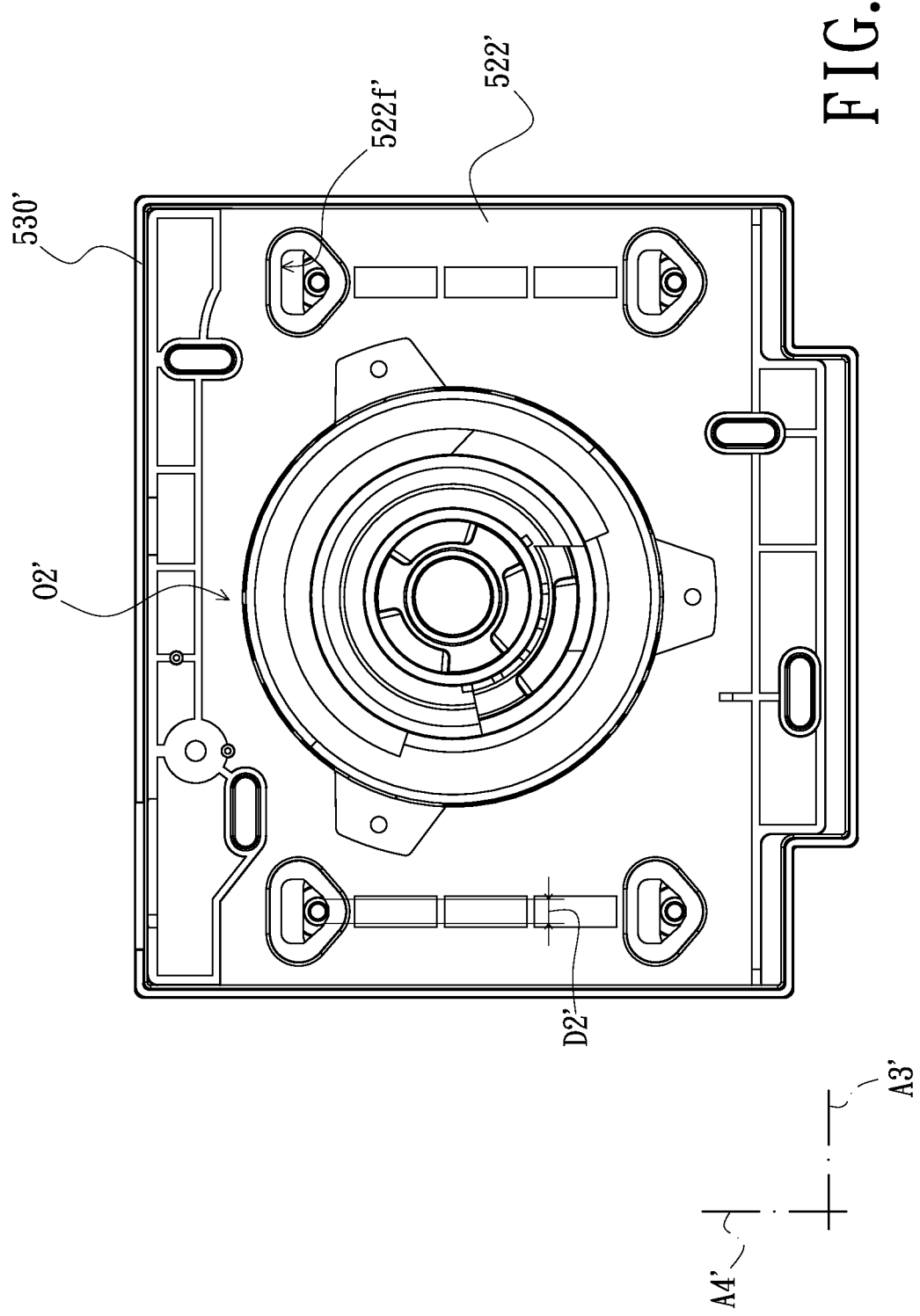
FIG. 15B is a schematic view showing that the first tray of the second embodiment is at a second position relative to the second tray.

Referring to FIGS. 15A and 15B, when the first tray 522' is located at a first position O1' relative to the second tray 530', the second tray 530' limited by the holes 522f has the first move distance D1' along the first axis A3'. When the first tray 522' is located at a second position O2' relative to the second tray 530', the second tray 530' limited by the holes 522f has the second move distance D2' along the first axis A3'. The first move distance D1' is different from the second move distance D2'.

Because the lens 524' may be disposed between the first tray 522' and the base 510' to contact the first tray 522' and the base 510', compared with the conventional art, the cumulative tolerance between the lens 524' of the lens device 520' and the base 510' is reduced after the lens-adjusting module 500' is assembled.

According to the mentioned above, the lens-adjusting module of each of the embodiments of the invention has at least one of the following advantages or other advantages:

1. Because the arrangement of the elements in the lens-adjusting module of each of the embodiments of the invention is different from the arrangement of the elements in the lens-adjusting module of the conventional art, a designer may use the lens-adjusting module of each of the embodiments of the invention according to the designer's requirement of spacing planning. Therefore, the arrangement of the elements in the lens-adjusting module of each of the embodiments of the invention may satisfy another designer having another requirement of space planning.

2. As far as the first embodiment is concerned, because the lens of the embodiment of the invention may be disposed on the first tray to contact the first tray and the first tray may be disposed on the base to contact the base, compared with the conventional art, the cumulative tolerance between the lens of the lens device and the base is reduced after the lens-adjusting module is assembled. Therefore, the predetermined interval between the lens device and the base is comparatively not adversely affected by the cumulative tolerance such that an image projected by the lens disposed on the first tray is comparatively not out of focus.

3. As far as the second embodiment is concerned, because the lens of the embodiment of the invention may be disposed between the first tray and the base to contact the first tray and the base, compared with the conventional art, the cumulative tolerance between the lens of the lens device and the base is reduced after the lens-adjusting module is assembled.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A lens-adjusting module comprising:
a base;
a lens device being movably disposed on the base and contacting the base, comprising:
a first tray being movably disposed on the base and contacting the base; and
a lens being fixed to the first tray and contacting the first tray;
a second tray being movably disposed on the base and contacting the base, wherein the first tray is movably disposed on the second tray, and the first tray is located between the second tray and the base;
an adjusting device, comprising:
a first lever pivoted to the base, wherein a part of the first lever is slidingly disposed on the first tray, and the first lever is adapted to rotate to drive the first tray and the second tray such that the first tray and the second tray move together relatively to the base and move along a first axis; and
a second lever pivoted to the base, wherein a part of the second lever is slidingly disposed on the first tray, and the second lever is adapted to rotate to drive the first tray such that the first tray moves relatively to the second tray and the base and moves along a second axis; and
a shell, wherein the first lever comprises a first lever body, a second lever body, a first elastic element, and a first non-skid element, the first elastic element connects the first lever body and the second lever body, the first lever body is pivoted to the base, the first non-skid element is disposed between the second lever body and the shell, and the first elastic element is adapted to exert a first prestressing force on the second lever body such that the first non-skid element contacts the shell.

2. The lens-adjusting module as claimed in claim 1, wherein the first tray has a first sliding trench and a second sliding trench, the first sliding trench extends along the second axis, the second sliding trench extends along the first axis, the part of the first lever is a first column slidingly disposed on the first sliding trench, and the part of the second lever is a second column slidingly disposed on the second sliding trench.

3. The lens-adjusting module as claimed in claim 1, wherein the first tray has a first sliding trench and a second column, the first sliding trench extends along the second axis, the part of the first lever is a first column slidingly disposed on the first sliding trench, the part of the second lever is a second sliding trench slidingly disposed on the second column, and the second sliding trench is an arc-shaped sliding trench.

4. The lens-adjusting module as claimed in claim 1, wherein the first lever is adapted to rotate about a first axle center line, the second lever is adapted rotate about a second axle center line, the first axis is parallel to the second axle center line, and the first axle center line is perpendicular to the first axis and the second axis.

5. The lens-adjusting module as claimed in claim 1, wherein the first tray comprises a plurality of first sliding blocks, the second tray has a plurality of third sliding trenches, each of the third sliding trenches extends along the second axis, and the first sliding blocks are slidingly disposed on the third sliding trenches respectively such that the first tray is movably disposed on the second tray.

6. The lens-adjusting module as claimed in claim 1, further comprising a plurality of second sliding blocks, wherein the second tray further has a plurality of fourth sliding trenches, each of the fourth sliding trenches extends along the first axis, and the second sliding blocks respectively pass through the fourth sliding trenches to be fixed to the base such that the second tray is movably disposed on the base and such that the second tray and the base clamps the first tray.

7. The lens-adjusting module as claimed in claim 1, wherein the first tray has a plurality of third sliding blocks, the base has a plurality of contact portions, and the third sliding blocks are slidingly disposed at the contact portions respectively such that the first tray is movably disposed on the base.

8. The lens-adjusting module as claimed in claim 7, wherein the first tray limited by the contact portions has a first move distance along the first axis when the first tray is located at a first position relative to the base, the first tray limited by the contact portions has a second move distance along the first axis when the first tray is located at a second position relative to the base, and the first move distance is different from the second move distance.

9. The lens-adjusting module as claimed in claim 1, wherein the second lever comprises a third lever body, a fourth lever body, a second elastic element, and a second non-skid element, the second elastic element connects the third lever body and the fourth lever body, the third lever body is pivoted to the base, the second non-skid element is disposed between the fourth lever body and the shell, and the second elastic element is adapted to exert a second prestressing force on the fourth lever body such that the second non-skid element contacts the shell.

10. A lens-adjusting module, comprising:
a base;
a lens device being movably disposed on the base and contacting the base, comprising:
a first tray movably disposed on the base; and
a lens being fixed to the first tray and contacting the first tray and the base respectively;
a second tray movably disposed on the base, wherein the first tray is movably disposed on the second tray, and the first tray is located between the second tray and the base;
an adjusting device, comprising:
a first lever pivoted to the base, wherein a part of the first lever is slidingly disposed on the first tray, and the first lever is adapted to rotate to drive the first tray and the second tray such that the first tray and the second tray move together relatively to the base and move along a first axis; and
a second lever pivoted to the base, wherein a part of the second lever is slidingly disposed on the first tray, and the second lever is adapted to rotate to drive the first tray such that the first tray moves relatively to the second tray and the base and moves along a second axis; and
a shell, wherein the first lever comprises a first lever body, a second lever body, a first elastic element, and a first non-skid element, the first elastic element connects the first lever body and the second lever body, the first lever body is pivoted to the base, the first non-skid element is disposed between the second lever body and the shell, and the first elastic element is adapted to exert a first prestressing force on the second lever body such that the first non-skid element contacts the shell.

11. The lens-adjusting module as claimed in claim 10, wherein the first tray has a first sliding trench and a second sliding trench, the first sliding trench extends along the second axis, the second sliding trench extends along the first axis, the part of the first lever is a first column slidingly disposed on the first sliding trench, and the part of the second lever is a second column slidingly disposed on the second sliding trench.

12. The lens-adjusting module as claimed in claim 10, wherein the first tray has a first sliding trench and a second column, the first sliding trench extends along the second axis, the part of the first lever is a first column slidingly disposed on the first sliding trench, the part of the second lever is a second sliding trench slidingly disposed on the second column, and the second sliding trench is an arc-shaped sliding trench.

13. The lens-adjusting module as claimed in claim 10, wherein the first lever is adapted to rotate about a first axle center line, the second lever is adapted to rotate about a second axle center line, the first axis is parallel to the second axle center line, and the first axle center line is perpendicular to the first axis and the second axis.

14. The lens-adjusting module as claimed in claim 10, wherein the first tray comprises a plurality of first sliding blocks, the second tray has a plurality of third sliding trenches, each of the third sliding trenches extends along the second axis, the first sliding blocks are slidingly disposed on the third sliding trenches respectively such that the first tray is movably disposed on the second tray.

15. The lens-adjusting module as claimed in claim 10, further comprising a plurality of second sliding blocks, wherein the second tray further has a plurality of fourth sliding trenches, each of the fourth sliding trenches extends along the first axis, the first tray further has a plurality of holes, the fourth sliding trenches are corresponding to the holes respectively, and the second sliding blocks respectively pass through the fourth sliding trenches and the holes to be fixed on the base such that the first tray and the second tray are movably disposed on the base and such that the second tray and the base clamps the first tray.

16. The lens-adjusting module as claimed in claim 15, wherein, the second tray limited by the holes has a first move distance along the first axis when the first tray is located at a first position relative to the second tray, the second tray limited by the holes has a second move distance along the first axis when the first tray is located at a second position relative to the second tray, and the first move distance is different from the second move distance.

17. The lens-adjusting module as claimed in claim 10, wherein the first tray has a plurality of third sliding blocks, the lens has a plurality of first contact portions, the base has a plurality of second contact portions, the third sliding blocks are disposed on the first contact portions respectively, and the first contact portions are slidingly disposed on the second contact portions respectively such that the first tray is movably disposed on the base.

18. The lens-adjusting module as claimed in claim 10, wherein the second lever comprises a third lever body, a fourth lever body, a second elastic element, and a second non-skid element, the second elastic element contacts the third lever body and the fourth lever body, the third lever body is pivoted to the base, the second non-skid element is disposed between the fourth lever body and the shell, and the second elastic element is adapted to exert a second prestressing force on the fourth lever body such that the second non-skid element contacts the shell.

* * * * *